United States Patent [19]

Nakayama et al.

[11] 4,410,059

[45] Oct. 18, 1983

[54] FLUID-OPERATED CONTROL APPARATUS FOR POWER-ASSISTED STEERING SYSTEM OF AUTOMOTIVE VEHICLE

[75] Inventors: Masafumi Nakayama; Tokiyoshi Yanai; Masato Fukino, all of Yokosuka, Japan

[73] Assignee: Nissan Motor Company, Limited, Yokohama, Japan

[21] Appl. No.: 359,678

[22] Filed: Mar. 19, 1982

[30] Foreign Application Priority Data

Apr. 8, 1981 [JP] Japan .................................. 56-52789
Jul. 2, 1981 [JP] Japan ............................ 56-98991[U]

[51] Int. Cl.³ ............................................. B62D 5/08
[52] U.S. Cl. ...................................... 180/143; 91/432; 180/142
[58] Field of Search ................ 180/143, 141, 142, 132; 91/434, 370, 371

[56] References Cited

U.S. PATENT DOCUMENTS

| 3,693,747 | 9/1972 | Nishikawa ........................... 180/143 |
| 3,908,779 | 9/1975 | Inoue .................................. 180/143 |
| 3,924,705 | 12/1975 | Sugisawa ............................ 180/143 |
| 4,119,172 | 10/1978 | Yanagishima et al. . |

FOREIGN PATENT DOCUMENTS

| 1705 | 10/1978 | European Pat. Off. . |
| 1704 | 5/1979 | European Pat. Off. . |
| 5141736 | 9/1973 | Japan . |
| 1519063 | 7/1978 | United Kingdom . |
| 2027399 | 2/1980 | United Kingdom . |

Primary Examiner—Joseph F. Peters, Jr.
Assistant Examiner—Donn McGiehan
Attorney, Agent, or Firm—Lane, Aitken & Kananen

[57] ABSTRACT

A control apparatus for a power-assisted vehicle steering system, comprising a power cylinder having two pressure-acting chambers, a control valve having inlet and outlet ports respectively communicable with a pump and a fluid reservoir and selectively with the inlet and outlet ports, a pressure compensating valve having an inlet port communicating with the pressure-acting chambers, outlet and control ports and a valve member for varying the degree of communication between the inlet and outlet ports, the fluid pressure in the inlet port being variable with the fluid pressure from the pump and urging the valve member to move in one direction and a spring urging the valve member to move in the other direction to maintain constant the differential pressure between the inlet and outlet ports, and a pressure reducing valve having an inlet port communicating with the outlet port of the compensating valve, a discharge port communicating with the reservoir and the control port of the compensating valve and a valve member to vary the degree of communication between the inlet and discharge ports of the reducing valve, the fluid pressure in the discharge port being directed to the control port and developing therein the fluid pressure urging the valve member of the compensating valve for movement in the said other direction, the valve member of the reducing valve being responsive to a signal variable with vehicle speed.

10 Claims, 4 Drawing Figures

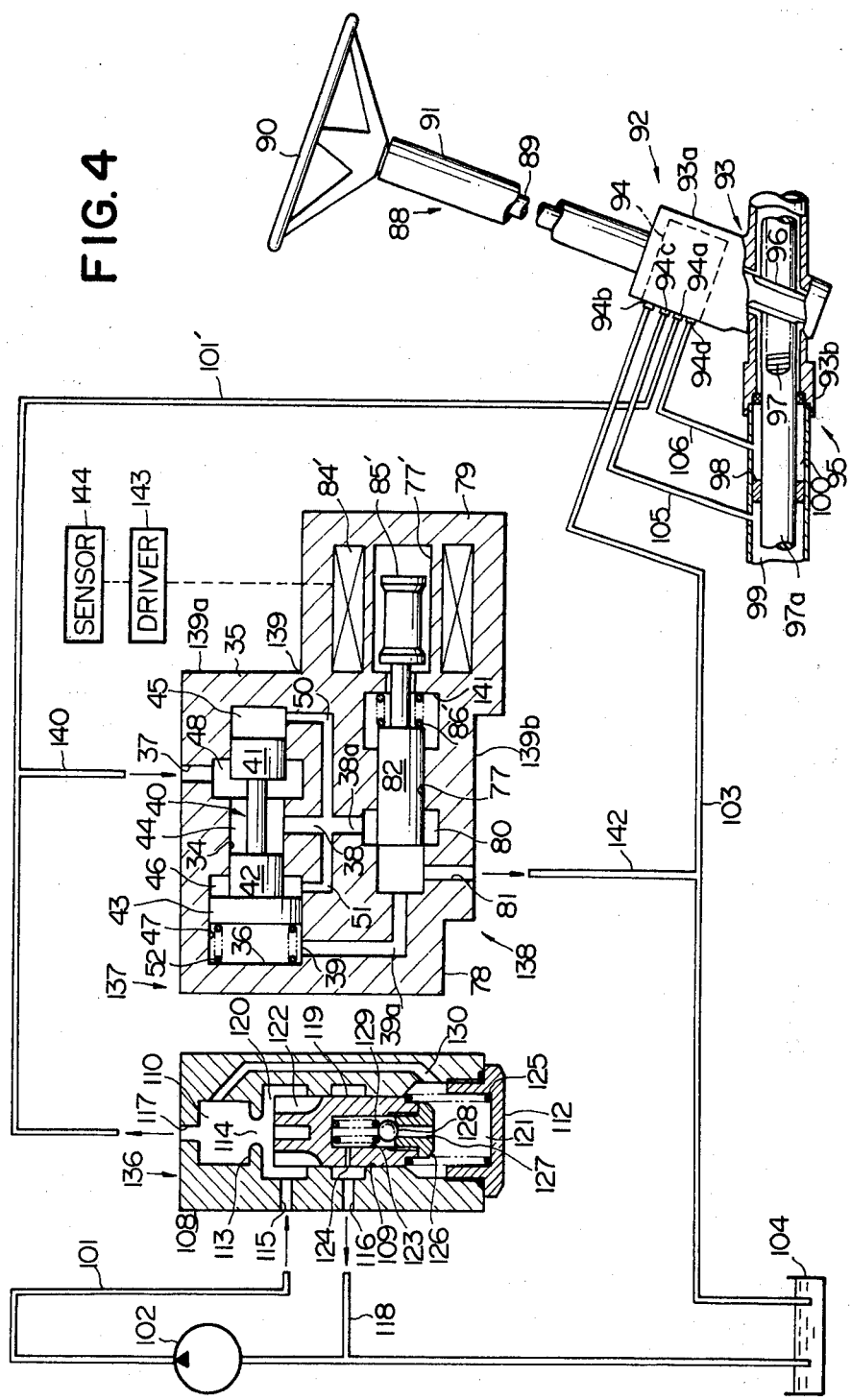

FLUID-OPERATED CONTROL APPARATUS FOR POWER-ASSISTED STEERING SYSTEM OF AUTOMOTIVE VEHICLE

FIELD OF THE INVENTION

The present invention relates to a fluid-operated control apparatus for a power-assisted steering system of a steerable vehicle and, more particularly to a fluid-operated control apparatus adapted to boost a driver's manual effort applied to the steering wheel and shaft assembly with a hydraulic fluid pressure which is variable with vehicle speed.

BACKGROUND OF THE INVENTION

It is well known in the art that the reaction transmitted from the steered road wheels of an automotive vehicle to the driver's manipulative effort applied to the steering wheel when the road wheels are being steered increases with a decrease in the vehicle speed and peaks when the vehicle is held at a halt. A power-assisted steering system of an automotive vehicle has thus been developed principally with a view to permitting a vehicle driver to maneuver the steering system with a reduced manipulative effort at relatively low vehicle speeds or when the vehicle is held at a halt. As a corollary of such an intrinsic function of a power-assisted steering system, the steering wheel tends to become so unresisting to the driver's effort applied to the wheel as to cause the vehicle to be oversteered or otherwise make an unintended or unwanted turn that would result in a serious accident. When, furthermore, the driver of a vehicle intends to steer the vehicle through a small angle in an attempt to adjust the direction of travel of the vehicle so as to recover a lateral slip of the vehicle under the influence of a sidewind, the steering wheel tends to be turned through an unnecessarily large angle and may cause the vehicle to wobble.

An advanced version of a power-assisted steering system has therefore been proposed and put to practical use which is adapted to produce reduced hydraulic steering assistance at medium-to-high vehicle speeds and increased hydraulic steering assistance at low-to-medium vehicle speeds, a typical example of such a power-assisted steering system being disclosed in Japanese Patent Publication No. 51-41736. The steering system therein taught has a fluid-operated steering power cylinder assembly in which two pressure-acting chambers are provided across a power piston and communicate with each other through a bypass passageway. The bypass passageway thus provided between the two pressure-acting chambers is arranged with a servo valve adapted to vary the flow rate of fluid therethrough in response to changes in vehicle speed. When the vehicle is cruising at relatively high speeds, the servo valve is conditioned to provide relatively high flow rates of fluid therethrough so that the pressurized fluid introduced into one of the pressure-acting chambers is circulated to the other pressure-acting chamber at rates dependent on the vehicle speeds. This causes reduction in the fluid pressure in the former fluid-acting chamber and accordingly in the hydraulic steering assistance achieved by the cylinder assembly.

A drawback is encountered in a prior-art power-assisted steering system of the above described nature in that the flow rate of fluid through the servo valve is subjected to change due to the difference between the respective fluid pressures in the pressure-acting chambers. Thus, the differential pressure effective between the pressure-acting chambers is affected by the flow rate of fluid through the servo valve and for this reason can not be controlled with accuracy, making it impossible to precisely control the steering effort to be achieved by the steering system. Because, furthermore, of the fact that only a limited differential pressure is in play between the two pressure-acting chambers when the vehicle is being steered through a small angle to recover the lateral slip of the vehicle as caused by a sidewind, the differential pressure between the pressure-acting chambers and accordingly the steering effort achieved by the steering system can not be properly controlled in response to changes in the vehicle speed. The present invention contemplates provision of an improved fluid-operated control apparatus for a steering system overcoming these drawbacks of a prior-art power-assisted steering system of the described general nature.

SUMMARY OF THE INVENTION

In accordance with the present invention, there is provided a fluid-operated control apparatus for a power-assisted steering system of a steerable vehicle, comprising signal generating means for producing a signal representative of vehicle speed, fluid storage means adapted to have fluid stored therein, fluid-displacement means operative to suck in fluid from the fluid storage means and deliver fluid under pressure, a steering wheel and shaft assembly rotatable about an axis therethrough, a steering pressure control valve assembly responsive to turning motion of the steering wheel and shaft assembly and having a fluid inlet port communicable with the fluid-displacement means, a fluid outlet port communicating with the fluid storage means, and first and second control fluid ports, the valve assembly being shiftable in operation between conditions having the fluid inlet port held in communication with one of the first and second control fluid ports and having the fluid outlet port held in communication with the other of the first and second control fluid ports, respectively, and a condition having the fluid inlet and outlet ports held in communication with each other, a steering power cylinder assembly comprising a housing and a piston operatively connected to the wheel and shaft assembly and movable in the housing for having formed therein first and second pressure-acting chambers separate from each other across the power piston and communicating with the first and second control fluid ports, respectively, a pressure compensating valve assembly which is formed with a fluid inlet port communicable with each of the pressure-acting chambers of the cylinder assembly, a fluid outlet port and a control fluid port and which comprises a valve member movable for continuously varying the degree of communication between the fluid inlet and outlet ports of the valve assembly, the valve member having pressure-acting areas to be subjected to fluid pressures in first and second directions opposite to each other, the fluid pressure in the fluid inlet port being variable with the pressure of the fluid delivered from the fluid-displacement means and urging the valve member for movement in the first direction and a biasing element urging the valve member to move in the second direction, and a pressure reducing valve assembly which is formed with a fluid inlet port communicating with the fluid outlet port of the pressure compensating valve assembly and a fluid discharge port communicating with the fluid storage means and with the control fluid port of the pressure compensating valve assembly for urging the valve member for movement and which comprises a valve member movable for continuously varying the degree of communication between the fluid inlet and discharge ports of the pressure reducing valve assembly, the fluid pressure in the fluid discharge port being directed into the control fluid port and developing therein the fluid pressure urging the valve member of the pressure compensating valve assembly for movement in the second direction, the valve member of the pressure reducing valve assembly being responsive to the above mentioned signal and being moved in a direction to vary the degree of communication between the fluid inlet and discharge ports of the pressure reducing valve assembly in response to the aforesaid signal. An apparatus according to the present invention may further comprise a pressure regulator valve assembly which is formed with first and second cavities, a flow restriction passageway formed between the cavities, a fluid inlet port open to the first cavity and communicating with the fluid-displacement means, a fluid discharge port open to the first cavity and communicating with the fluid storage means and a fluid outlet port open to the second cavity and communicating with the fluid inlet port of the pressure compensating valve assembly and the fluid inlet port of the steering pressure control valve assembly and which comprises a valve member movable in the first cavity and having formed in the first cavity first and second pressure-acting chambers thereacross, the first pressure-acting chamber communicating with the second cavity and the pressure regulator valve assembly being further formed with a passageway providing constant communication between the second cavity and second pressure-acting chamber, the valve member of the pressure regulator valve assembly being movable in the first cavity for continuously varying the degree of communication between the fluid inlet and discharge ports through the first cavity and providing a constant flow rate of fluid from the first pressure-acting chamber to the second cavity through the above mentioned flow restriction passageway.

BRIEF DESCRIPTION OF THE ACCOMPANYING DRAWINGS

The features and advantages of a fluid-operated control apparatus for a power-assisted steering system according to the present invention over prior-art power-assisted steering systems for steerable vehicles such as typically automotive vehicles will be appreciated more clearly from the following description taken in conjunction with the accompanying drawings in which like reference numerals are representative of similar or corresponding assemblies, units, members, elements and portions and in which.

Figure 1:
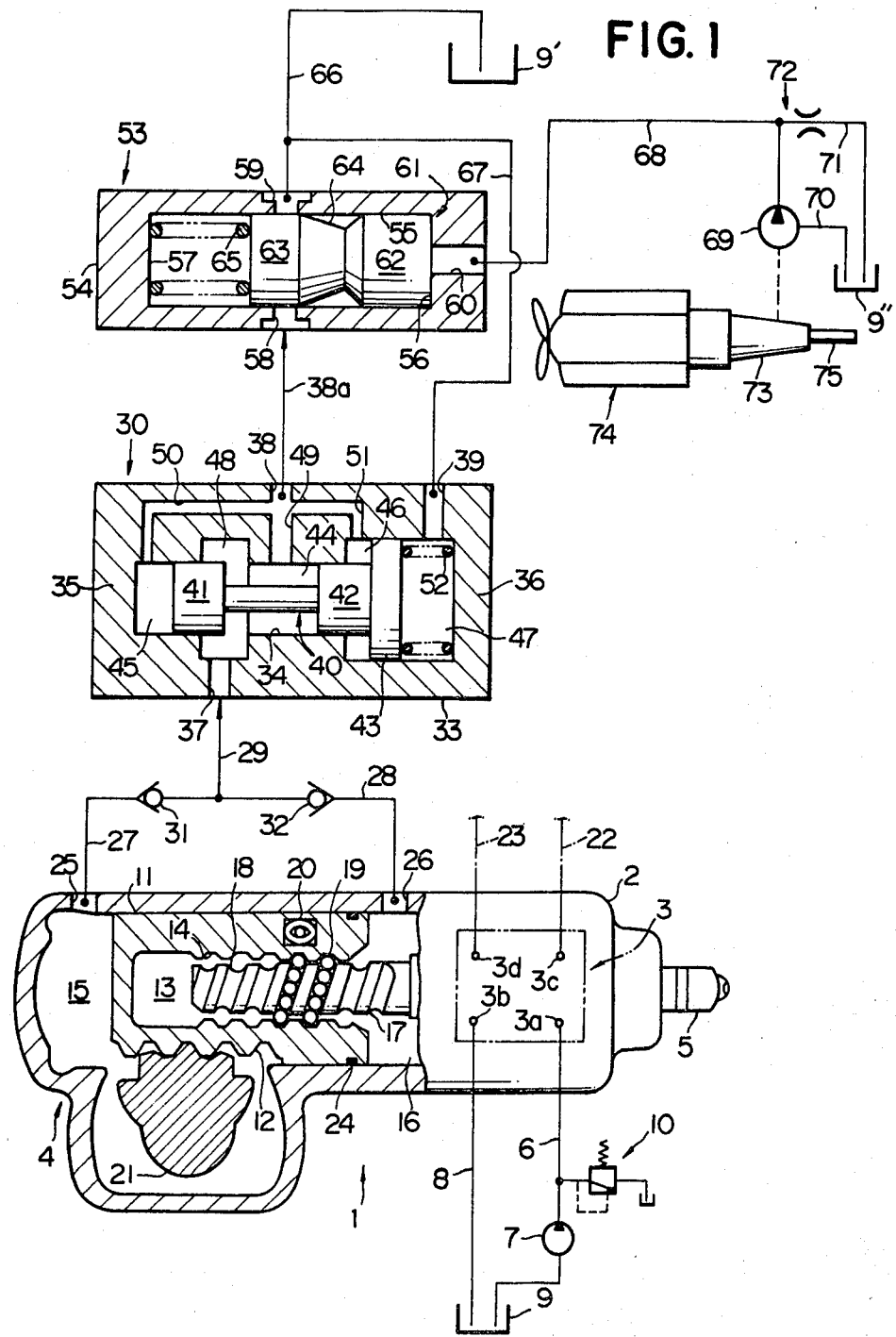
FIG. 1 is a schematic view showing, mostly in longitudinal section, a first preferred embodiment of the fluid-operated steering control apparatus according to the present invention.
Figure 2:
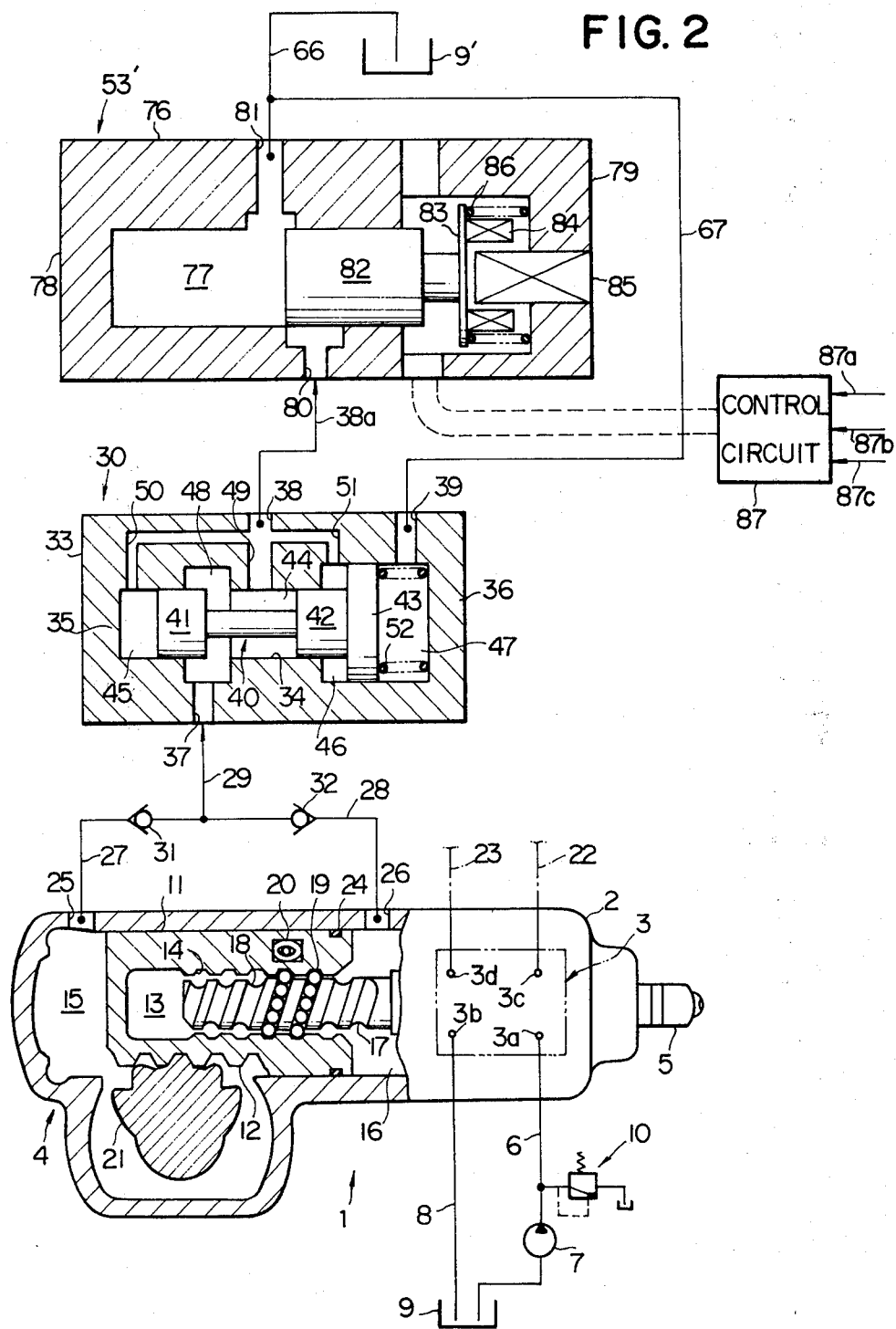
FIG. 2 is a view similar to FIG. 1 but showing a second preferred embodiment of the fluid-operated steering control apparatus according to the present invention.
Figure 3:
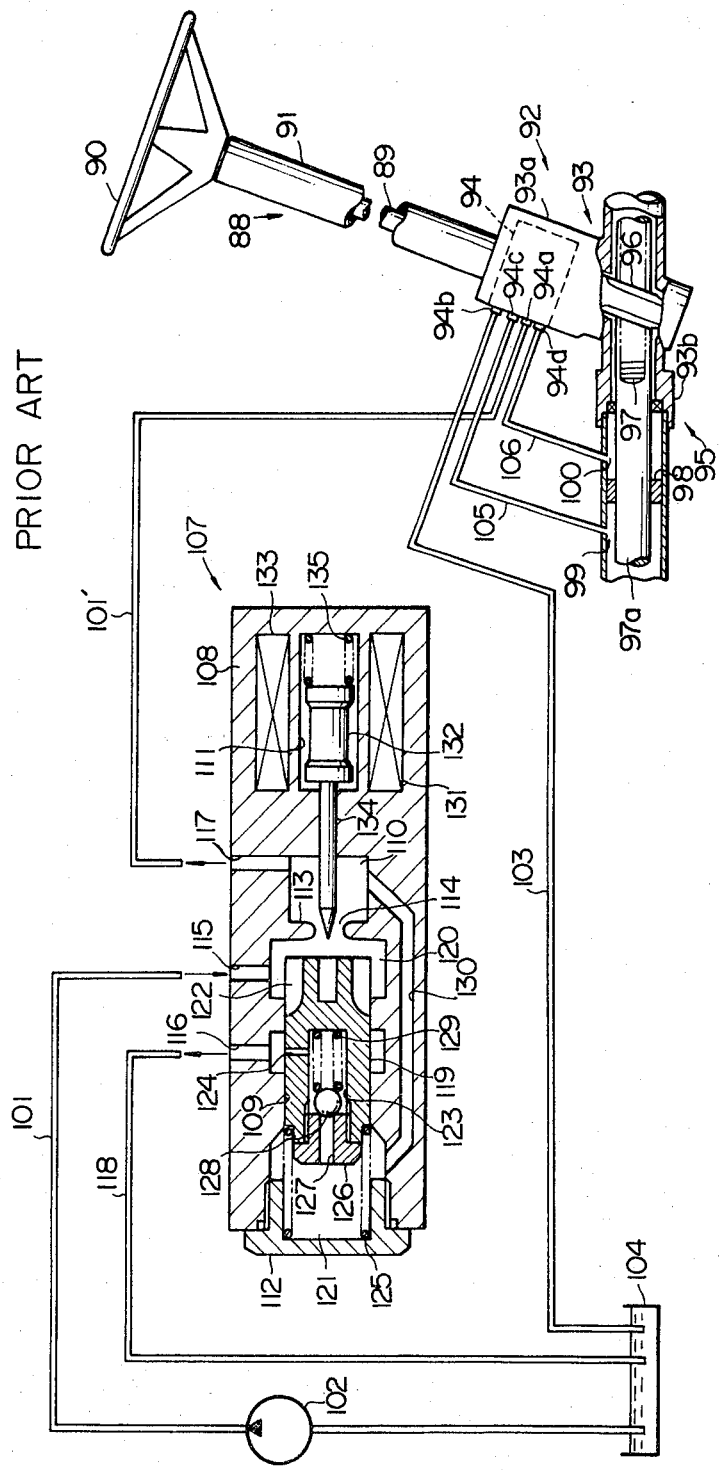

FIG. 3 is a schematic view showing, partially in longtudinal section, an example of a known fluid-operated steering control apparatus, the control apparatus herein shown being a modification of the prior-art power-assisted steering system described at the outset of the description; and FIG. 4 is a view similar to FIG. 1 but showing a third preferred embodiment of the fluid-operated steering control apparatus according to the present invention, the third preferred embodiment of the present invention being an improved version of the prior-art fluid-operated steering control apparatus shown in FIG. 3 and having incorporated therein the essential features of the embodiment shown in FIG. 2.

DETAILED DESCRIPTION OF THE INVENTION

Referring to FIG. 1, a first preferred embodiment of a fluid-operated steering control apparatus according to the present invention comprises an integral steering gear unit 1 having a steering gear housing 2 having incorporated therein a steering pressure control valve assembly schematically shown at 3 and a steering power cylinder assembly 4. The steering gear unit 1 further has a stub shaft 5 axially protruding outwardly from the steering gear housing 2. The steering gear unit 1 is provided in combination with a steering wheel and shaft assembly (not shown) which comprises a steering shaft having a steering wheel carried at the upper end thereof. The steering shaft is operatively connected at its lower end to the stub shaft 5 usually by means of a univeral joint so that the stub shaft 5 is rotatable about the center axis thereof together with the steering wheel and shaft. The valve assembly 3, which is well known in the art, has fluid inlet and outlet ports 3a and 3b, and first and second control fluid ports 3c and 3d. The fluid inlet port 3a communicates through a fluid feed passageway 6 with the delivery port of fluid-displacement means constituted by a steering fluid feed pump 7, while the fluid outlet port 3b communicates through a fluid discharge passageway 8 with suitable fluid storage means such as a fluid reservoir 9 also communicating with the suction port of the fluid feed pump 7. The fluid feed passageway 6 is provided with a pressure relief valve schematically indicated at 10. The pump 7 is operatively connected to the output shaft of an automotive internal combustion engine (not shown).

The steering power cylinder assembly 4 comprises a steering power piston 11 having an external toothed rack portion 12 and an axial blind bore 13 partially formed with a continuous helical groove 14. The steering power piston 11 is axially slidable in the gear housing 2, which is therefore internally formed with first and second pressure-acting chambers 15 and 16 axially across the power piston 11. The cylinder assembly 4 further comprises a worm shaft 17 axially aligned with and securely connected to the stub shaft 5 and formed with a continuous helical groove 18. The worm shaft 17 thus rotatable with the stub shaft 5 axially projects into the axial blind bore 13 in the steering power piston 11 and has a series of balls 19 rollably received in the internal helical groove 14 in the steering power piston 11 and the external helical groove 18 in the worm shaft 17. The series of balls 19 are adapted to be circulated and recirculated through the continuous channel formed by the respective helical grooves 14 and 18 in the power piston 11 and the worm shaft 17 and further by a ball return guide 20 formed in the power piston 11. The rack portion 12 of the steering power cylinder 11 is held in mesh with a sector gear 21 also provided within the steering gear housing 2. As is well known in the art, the sector gear 21 is mounted on and rotatable with a Pitman arm shaft (not shown) operatively connected by means of a steering linkage to the spindle assemblies of the steerable road wheels of the vehicle, though not shown in the drawings. The first and second control fluid ports 3c and 3d of the valve assembly 3 communicate with the above mentioned first and second pressure-acting chambers 15 and 16 of the cylinder assembly 4 through control fluid passageways 22 and 23, respectively. Designated by numeral 24 is an annular sealing element which is closely received in a circumferential groove in an outer periphery wall of the steering power piston 11 so as to have the pressure-acting chambers 15 and 16 hermetically sealed from each other across the power piston 11.

The pressure control valve assembly 3 is shiftable between three different conditions consisting of a left-turn driving condition, a right-turn driving condition and a neutral or straight-ahead driving condition depending upon the rotational position of the stub shaft 5 with respect to the steering gear housing 2. When the left-turn or right-turn driving condition is established in the valve assembly 3, the fluid inlet port 3a is permitted to communicate with one of the first and second control fluid ports 3c and 3d and the fluid outlet port 3b is permitted to communicate the other of the fluid ports 3c and 3d. As a consequence, the pressurized fluid delivered from the pump 7 is supplied through the fluid feed passageway 6, the fluid inlet port 3a and one of the control fluid ports 3c and 3d to the other of the fluid passageways 22 and 23 and enters one of the pressure-acting chambers 15 and 16 of the power cylinder assembly 4. The fluid pressure thus admitted into one of the pressure-acting chambers 15 and 16 acts on the steering power piston 11 and urges the power piston 11 to axially move in a direction in which the power piston 11 is driven to move by a driver's manual steering effort applied through the steering wheel and shaft assembly to the stub shaft 5. In this instance, the other of the pressure-acting chambers 15 and 16 communicates with the fluid reservoir 9 through the other of the control fluid passageways 22 and 23, the other of the control fluid ports 3c and 3d, the fluid outlet port 3b and the fluid discharge passageway 8.

The steering gear housing 2 is formed with first and second fluid ports 25 and 26 open to the first and second pressure-acting chambers 15 and 16, respectively, of the cylinder assembly 4. Fluid passageways 27 and 28 lead from these fluid ports 25 and 26, respectively, terminating in a common fluid passageway 29 which communicates with a pressure compensating valve assembly 30. The fluid passageways 27 and 28 have incorporated thereon one-way check valves 31 and 32, respectively, which are adapted to allow passage of fluid from the fluid ports 25 and 26 toward the fluid passageway 29 and to prevent flows of fluid in reverse directions toward the fluid ports 25 and 26, respectively, therethrough.

The pressure compensating valve assembly 30 comprises a cylindrical valve casing 33 formed with a cavity 34 axially elongated between the respective inner faces of opposite end walls 35 and 36 of the valve casing 33 and further with three fluid ports commonly open to the axial cavity 34 and consisting of a fluid inlet port 37, a fluid outlet port 38 and a control fluid port 39. Within the axial cavity 34 is axially slidable a valve spool 40 having first, second and third circumferential land portions 41, 42 and 43. The first, second and third circumferential land portions 41, 42 and 43 are arranged in such a manner that the second circumferential land portion 42 axially intervenes between the first and third circumferential land portions 41 and 43 and that the first and second circumferential land portions 41 and 42 have equal cross sectional areas smaller than the cross sectional area of the third circumferential land portion 43. The first and second circumferential land portions 41 and 42 are axially spaced apart from each other and thereby form therebetween a circumferential groove which forms part of a first pressure-acting chamber 44 in the valve casing 33. The first circumferential land portion 41 is located adjacent the inner face of the end wall 35 of the valve casing 33 and thus forms a second pressure-acting chamber 45 between the outer end face thereof and the inner face of the end wall 35. The second and third circumferential land portions 42 and 43 are axially adjacent each other and form an annular third variable-volume pressure-acting chamber 46 encircling at least an axial portion of the second circumferential land portion 42 as shown and a fourth pressure-acting chamber 47 between the outer end face of the third circumferential land portion 43 and the inner face of the end wall 36 of the valve casing 33. The valve casing 33 is further formed with an internal circumferential groove 48 forming part of the first pressure-acting chamber 44 between the land portions 41 and 42 of the valve spool 40 and being larger in sectional area than the remaining portion of the first pressure-acting chamber 44. The fluid inlet port 37 is directly open to the internal circumferential groove 48. On the other hand, the fluid outlet port 38 communicates with the first, second and third pressure-acting chambers 44, 45 and 46 through fluid passageways 49, 50 and 51, respectively, formed in the valve casing 33. Furthermore, the control fluid port 39 is open to the fourth pressure-acting chamber 47 between the third circumferential land portion 43 of the valve spool 40 and the inner face of the end wall 36 as shown. The valve spool 40 as a whole is axially movable in the axial cavity 34 away from the inner face of the end wall 35 through an axial position about to close the internal circumferential groove 48 as will be described more clearly as the description proceeds. The valve spool 40 is urged to axially move toward the inner face of the end wall 35 away from the inner face of the end wall 36, viz., in a direction to have the second and fourth pressure-acting chambers 45 and 47 axially contracted and expanded, respectively, by suitable biasing means. In the embodiment herein shown, such biasing means is assumed as comprising a preloaded helical compression spring 52 which is seated at one end thereof on the inner face of the end wall 36 and at the other end thereof on the outer end face of the third circumferential land portion 43 of the valve spool 40. The previously mentioned fluid passageway 29 terminates in the fluid inlet port 37 of the pressure compensating valve assembly 30 constructed and arranged as above described. On the other hand, the fluid outlet port 38 of the valve assembly 30 communicates through a fluid passageway 38a with a pressure reducing valve assembly 53.

The pressure reducing valve assembly 53 comprises a generally cylindrical valve casing 54 formed with an axial cavity 55 elongated between the respective inner faces of opposite end walls 56 and 57 of the valve casing 54. The valve casing 54 is further formed with fluid inlet and discharge ports 58 and 59 which are radially open to the axial cavity 55 and which are located diametrically opposite to each other across the axial cavity 55 or otherwise located on a common plane transverse to the valve casing 54. The valve casing 54 further has a control fluid port 60 formed in the above mentioned end wall 56. The pressure reducing valve assembly 53 further comprises a valve spool 61 axially slidable in the cavity 55 between the respective inner faces of the end walls 56 and 57. The valve spool 61 has first and second cylindrical land portions 62 and 63 and two frusto-conical intermediate axial portions respectively tapering from the cylindrical land portions 62 and 63 and merging with each other at their respective reduced ends, thereby forming a circumferential groove 64 axially intervening between the land portions 62 and 63 and having a V-shaped cross section. When the valve spool 61 assumes in the axial cavity 55 an axial position in which the first cylindrical land portion 62 of the valve spool 61 is held in contact with the inner face of the end wall 56, the second cylindrical land portion 63 of the valve spool 61 is held in an axial position closing the fluid inlet and discharge ports 58 and 59. When the valve spool 61 is axially moved in the axial cavity 55 away from the inner face of the end wall 56, the second cylindrical land portion 63 of the valve spool 61 is axially moved past the fluid inlet and discharge ports 58 and 59, which are thus allowed to be open to the circumferential groove 64 in the valve spool 61. The valve spool 61 is urged to stay in the above mentioned axial position having the land portion 62 held in contact with the inner face of the end wall 56 by a suitable biasing means which is shown comprising a preloaded helical compression spring 65 seated at one end thereof on the inner face of the end wall 57 and at the other end thereof on the outer end face of the second cylindrical land portion 63 of the valve spool 61. The fluid inlet port 58 of the pressure reducing valve assembly 53 thus constructed and arranged communicates with the fluid outlet port 38 of the pressure compensating valve assembly 30 through the previously mentioned fluid passageway 38a. The fluid discharge port 59 of the pressure reducing valve assembly 53 communicates on one hand to a fluid reservoir 9' through a fluid discharge passageway 66 and on the other hand to the control fluid port 39 of the pressure compensating valve assembly 30 through a fluid feedback passageway 67. Furthermore, the control fluid port 60 of the pressure reducing valve assembly 53 communicates through a fluid feed passageway 68 with the delivery port of a variable-displacement steering control pressure delivery pump 69 having the suction port communicating through a fluid discharge passageway 70 with a fluid reservoir 9". Constant communication is also established between the fluid feed passageway 68 and the fluid reservoir 9" through a fluid passageway 71 provided with a fluid flow restriction means constituted by an orifice 72. The orifice 72 is adapted to create a pressure differential between the fluid feed passageway 68 and the fluid reservoir 9". The fluid reservoirs 9, 9' and 9" hereinbefore mentioned are shown as being arranged independently of each other but are assumed to be constituted by a single fluid reservoir. The steering control pressure delivery pump 69 constitutes a source of fluid pressure variable with vehicle speed and is operatively connected to, for example, the output shaft (not shown) of a power transmission 73 intervening between an automotive internal combustion engine 74 and a propeller shaft 75 forming part of a vehicle driveline.

When, now, the internal combustion engine 74 in the arrangement shown in FIG. 1 is in operation and is driving the output shaft of the power transmission 73 at a certain speed, the steering control pressure delivery pump 69 is driven to deliver a fluid pressure variable with the revolution speed of the power transmission output shaft. The fluid pressure thus produced by the steering pressure delivery pump 69 is directed through the fluid feed passageway 68 to the control fluid port 60 of the pressure reducing valve assembly 53 and acts on the outer end face of the first cylindrical land portion 62 of the valve spool 61. If, in this distance, the fluid pressure developed by the pump 69 or, in other words, the revolution speed of the power transmission output shaft, is higher than predetermined values, respectively, the force resulting from the fluid pressure acting on the outer end face of the first cylindrical land portion 62 causes the valve spool 61 to axially move away from the inner face of the end wall 56 against the compression spring 65. As the valve spool 61 is thus axially moved away from the inner face of the end wall 56, the second cylindrical land portion 63 of the valve spool 61 is moved past the fluid inlet and discharge ports 58 and 59 so that the circumferential groove 64 in the valve spool 61 becomes contiguous to the ports 58 and 59, providing communication between the fluid inlet and discharge ports 58 and 59 through the circumferential groove 64. As the circumferential groove 64 is formed by the frusto-conical or tapering intermediate axial portions of the valve spool 61, the flow rate of fluid from the fluid inlet port 58 to the fluid discharge port 59 of the pressure reducing valve assembly 53 increases as the valve spool 61 is axially moved away from the inner face of the end wall 56 and is, thus, continuously variable with the fluid pressure delivered from the steering control pressure delivery pump 69 and accordingly with the vehicle speed which is represented by the revolution speed of the power transmission output shaft.

When the steering shaft and accordingly the stub shaft 5 are under these conditions driven to turn about their respective center axes by a driver's manual steering effort applied to the steering wheel, the worm shaft 17 is caused to turn in either direction with respect to the steering power piston 11. As the worm shaft 17 is thus caused to turn, the series of balls 19 are forced to move in the helical groove 18 toward or away from the leading end of the shaft 17 and impart an axial thrust to the power piston 11. It therefore follows that the power piston 11 is axially driven to move in either direction in and with respect to the steering gear housing 2. The turning motion of the stub shaft 5 further establishes a left-turn or right-turn driving condition in the steering pressure control valve assembly 3 so that communication is established from the fluid inlet port 3a to one of the first and second control fluid ports 3c and 3d and from the other of the control fluid ports 3c and 3d to the fluid outlet port 3b of the valve assembly 3. The fluid pressure developed by the steering fluid feed pump 7 is thus directed through the fluid feed passageway 6, the fluid inlet port 3a, one of the first and second control fluid ports 3c and 3d, and one of the fluid passageways 22 and 23 to one of the first and second pressure-acting chambers 15 and 16 of the cylinder assembly 4. The fluid pressure introduced into the first pressure-acting chamber 15 or the second pressure-acting chamber 16 acts axially on the steering power piston 11 and urges the power piston 11 to axially move within the steering gear housing 2 in the direction in which the power piston 11 is driven to move by the worm shaft 17 by means of the series of balls 19. The steering power piston 11 is in this fashion aided by the fluid pressure in moving in the particular direction with respect to the steering gear housing 2. The axial movement of the steering power piston 11 causes a turning motion of the sector gear 21 on the Pitman arm shaft and ultimately drives the steerable road wheels of the vehicle to swing leftwardly or rightwardly on the road surface, as is well known in the art. When the fluid inlet port 3a of the steering pressure control valve assembly 3 is held in communication with one of the first and second control fluid ports 3c and 3d and accordingly with one of the first and second pressure-acting chambers 15 and 16, communication is established between the fluid reservoir 9 and the other of the first and second control fluid ports 3c and 3d. The other of the first and second pressure-acting chambers 15 and 16 is therefore permitted to communicate with the fluid reservoir 9 through the fluid passageway 22 or 23, the first or second control fluid port 3c or 3d and the fluid outlet port 3b and the fluid discharge passageway 8 and, as a consequence, has no fluid pressure developed therein.

The fluid pressure introduced from the steering fluid feed pump 7 into one of the first and second pressure-acting chambers 15 and 16 as above described is further passed over to the pressure compensating valve assembly 30 through the fluid port 25 or 26, the fluid passageway 27 or 28, the one-way check valve 31 or 32 and the fluid passageway 29. The fluid pressure thus directed to the fluid passageway 29 enters the fluid inlet port 37 of the valve assembly 30 and is passed through the first pressure-acting chamber 44 and the first fluid passageway 49 to the fluid outlet port 38. From the fluid outlet port 38, the fluid pressure is on one hand distributed through the second and third fluid passageways 50 and 51 to the second and third pressure-acting chambers 45 and 46, respectively, and is on the other hand directed through the fluid passageway 38a to the fluid inlet port 58 of the pressure reducing valve assembly 53. The fluid pressure admitted into the second pressure-acting chamber 45 acts on the outer end face of the first circumferential land portion 41 of the valve spool 40 while the fluid pressure admitted into the third pressure-acting chamber 46 acts on the annular inner end face of the third circumferential land portion 43 of the valve spool 40. On the other hand, the fluid pressure directed to the fluid inlet port 58 of the pressure reducing valve assembly 53 is passed to the fluid discharge port 59 through the circumferential groove 64 in the valve spool 61 at a rate variable with vehicle speed as previously discussed. The fluid pressure thus developed in the fluid discharge port 59 is on one hand discharged through the fluid discharge passageway 66 to the fluid reservoir 9' and is on the other hand fed back to the control fluid port 39 of the pressure compensating valve assembly 30 through the fluid feedback passageway 67. The fluid pressure fed back to the control fluid port 39 enters the fourth pressure-acting chamber 47 and acts upon the outer end face of the third circumferential land portion 43 of the valve spool 40. Because, in this instance, of the fact that the first and second circumferential land portions 41 and 42 of the valve spool 40 are substantially equal in cross sectional area as mentioned previously, the forces resulting from the fluid pressures respectively acting on the inner end faces of the land portions 41 and 42 are cancelled by each other. For this reason, the valve spool 40 is urged to axially move away from the inner face of the end wall 35 by the force resulting from the fluid pressure acting on the outer end face of the first circumferential land portion 41 and the force resulting from the fluid pressure acting on the annular inner end face of the third circumferential land portion 43. The valve spool 40 is further urged to axially move in the opposite direction by the biasing force of the compression spring 52 and the force resulting from the fluid pressure acting on the outer end face of the third circumferential land portion 43. The valve spool 40 is thus operative to vary the clearance through which the fluid inlet port 37 is allowed to be open to the internal circumferential groove portion 48 of the first pressure-acting chamber 44. In this fashion, the valve spool 40 maintains an equilibrium axial position in the axial cavity 34 when the difference between the fluid pressure in the fluid outlet port 38 and the fluid pressure in the control fluid port 39 or, in other words, the differential pressure between the fluid inlet and discharge ports 58 and 59, assumes a predetermined value dictated by the cross sectional area of the third circumferential land portion 43 and the spring constant selected of the compression spring 52. Thus, the pressure compensating valve assembly 30 is operative to continuously vary the fluid pressure in the fluid outlet port 38 thereof and accordingly in the fluid inlet port 58 in such a manner that the difference between the fluid pressure in the fluid inlet port 58 and the fluid pressure in the fluid discharge port 59 is maintained constant. The fluid pressure introduced into one of the first and second pressure-acting chambers 15 and 16 is thus discharged to the fluid reservoir 9' as previously discussed. The result is that the fluid pressure to be developed in one of the first and second pressure-acting chambers 15 and 16 when the vehicle is being steered in either direction is reduced at a rate which varies proportionately with vehicle speed. Because, in this instance, of the fact that the fluid pressure to be developed in the fluid outlet port 38 of the pressure compensating valve assembly 30 is dictated solely by the vehicle speed and is thus not variable with the fluid pressure developed in the fluid inlet port 37 of the pressure compensating valve assembly 30, the flow rate of the fluid to be discharged to the fluid reservoir 9' through the series combination of the valve assemblies 30 and 53 varies solely with the vehicle speed. In other words, the rate at which the fluid pressure to act on the steering power piston 11 of the steering power cylinder assembly 4 is to be lessened is not affected by the value of the fluid pressure to be developed in the fluid inlet port 37 of the pressure compensating valve assembly 30 and accordingly in one of the first and second pressure-acting chambers 15 and 16 of the steering power cylinder assembly 4 but is variable solely by the vehicle speed with which the fluid pressure to be developed in the fluid discharge port 59 of the pressure reducing valve assembly 53 is variable. Since, furthermore, the fluid passageways 27 and 28 are provided with the one-way check valves 31 and 32, respectively, the fluid pressure to be discharged from one of the pressure-acting chambers 15 and 16 to the fluid reservoir 9' is not only precluded from being passed over to the other of the pressure-acting chambers 15 and 16 but, also neither affects nor is affected by the fluid pressure in the other pressure-acting chamber. The vehicle can therefore be steered accurately in a stable state when the direction of travel of the vehicle which is caused to laterally slip on a road surface under the influence of a sidewind is to be adjusted.

If, on the other hand, the fluid pressure developed by the pressure delivery pump 69 and accordingly the revolution speed of the power transmission output shaft are lower than the predetermined values, respectively, the value spool 61 is held in the axial position having the first cylindrical land portion 62 held in contact with the inner face of the end wall 56 by the compression spring 65. When the valve spool 61 is held in such an axial position in the valve casing 54, the fluid inlet and discharge ports 58 and 59 are closed by the land portion 63 so that there is no fluid pressure developed in the fluid discharge port 59 and accordingly in the control fluid port 39. Under these conditions, the fluid passageways 27 and 28 are isolated from the fluid reservoir 9' irrespective of the axial position of the valve spool 40. The fluid pressure directed into one of the first and second pressure-acting chambers 15 and 16 from the steering fluid feed pump 7 acts, without being modified or reduced, on the steering power piston 11.

When the steering pressure control valve assembly 3 is held in the neutral or straight-ahead driving condition, both of the first and second control ports 3c and 3d are held in communication with the fluid outlet port 3b. Under these conditions, there is no fluid pressure developed in the first and second pressure-acting chambers 15 and 16.

FIG. 2 shows a second preferred embodiment of a fluid-operated control apparatus for a power-assisted steering system according to the present invention. The embodiment herein shown is a modification of the embodiment shown in FIG. 1 and comprises a steering gear unit 1 and a pressure compensating valve assembly 30 which are entirely similar to their respective counterparts in the embodiment of FIG. 1. Thus, the fluid-operated control apparatus for a power-assisted steering system as shown in FIG. 2 differs from the embodiment of FIG. 1 simply in the construction and arrangement of the pressure reducing valve assembly which is now designated in its entirety by 53'. The pressure reducing valve assembly 53' shown in FIG. 2 comprises a generally cylindrical valve casing 76 formed with an axial cavity 77 elongated between the respective inner faces of opposite end walls 78 and 79 of the valve casing 76. The valve casing 76 is further formed with fluid inlet and discharge ports 80 and 81 which are radially open to the cavity 77 and which are slightly offset from each other axially of the valve casing 76. The valve assembly 53' further comprises a valve spool 82 axially slidable in the cavity 77 between the respective inner faces of the end walls 78 and 79. The valve spool 82 has an axial extension axially extending toward the inner face of the end wall 79 and securely connected at its leading end to a coil support disc member 83. The coil support disc member 83 has fixedly mounted thereon a cylindrical current-carrying coil unit 84 which is located in the vicinity of and axially movable with the valve spool 82 and the disc member 83 toward and away from the inner face of the end wall 79. The end wall 79 of the valve casing 76 is formed with an axial bore through which a cylindrical permanent magnet 85 is fixedly fitted to the valve casing 76 and axially projects into the cavity 77 toward the coil support disc member 83. The current-carrying coil unit 84 and the permanent magnet 85 are arranged in such a manner as to have respective center axes substantially coincident with each other and that the coil unit 84 and accordingly the valve spool 82 are caused to axially move within the cavity 77 away from the end wall 78 by the magnetic interaction between the coil unit 84 and the permanent magnet 85 when the coil unit 84 is electrically energized. The current-carrying coil unit 84 and the permanent magnet 85 constitute, in combination, solenoid-operated spool actuating means in the valve assembly 53' of the embodiment shown in FIG. 2. The valve spool 82 and accordingly the current-carrying coil unit 84 are urged by suitable biasing means for axial movement in the opposite direction within the cavity 77, viz., away from the annular inner face of the end wall 79. In FIG. 2, such biasing means is shown as comprising a preloaded helical compression spring 86 which is arranged in such a manner as to coaxially surround the coil unit 84 and which is seated at one end thereof on the above mentioned coil support disc member 83 and at the other end thereof on the annular inner face of the end wall 79. When the current-carrying coil unit 84 remains de-energized, the valve spool 82 and the coil unit 84 are held in respective axial positions remote from the annular inner face of the end wall 79 by the biasing force of the compression spring 86. As the valve spool 82 is held in such an axial position within the cavity 77, the fluid inlet port 80 is fully closed by the valve spool 82. When the current-carrying coil unit 84 is energized with an electric current which varies with vehicle speed, the coil unit 84 and accordingly the valve spool 82 are urged to axially move toward the annular inner face of the end wall portion 79 and allow the fluid inlet port 80 to be open to the axial cavity 77 and through the cavity 77 to the fluid discharge port 81 to a degree continuously variable with vehicle speed. When the coil unit 84 is thus energized with a current having an intensity larger than a predetermined value, the valve spool 82 is axially moved past the fluid inlet port 80 away from the inner face of the end wall 78 and provides communication between the fluid inlet and discharge ports 80 and 81 to a degree continuously varying with the vehicle speed. The ports 80 and 81 are, thus, formed and arranged so that the flow rate of fluid from the fluid inlet port 80 to the fluid discharge port 81 continuously decreases and increases as the valve spool 82 is axially moved respectively toward and away from the inner face of the end wall 78. The above mentioned solenoid-operated spool actuating means composed of the current-carrying coil unit 84 and the permanent magnet 85 is in this fashion operative to drive the valve spool 82 to axially move away from the end wall 78 against the force of the compression spring 86 a distance largely proportional or otherwise related to the intensity to which the current-carrying coil unit 84 is electrically energized. The current-carrying unit 84 has terminals connected to a power source (not shown) through an electric control circuit 87 having a suitable number of signal input terminals. In the embodiment shown in FIG. 2, these signal input terminals of the control circuit 87 are assumed, by way of example, as including a first signal input terminal 87a connected to a vehicle-speed sensor adapted to detect vehicle speed, and second and third signal input terminals 87b and 87c connected to sensors respectively adapted to detect other operational conditions of a vehicle such as, for example, the torque manually applied to the steering wheel and shaft and the rate of acceleration to which the vehicle is subjected under the influence of a sidewind, although such sensors are not herein shown. The signal current appearing in the first signal input terminal 87a continuously varies in intensity with the vehicle speed detected by the vehicle-speed sensor. Thus, the control circuit 87 is operative to supply the current-carrying coil unit 84 of the pressure reducing valve assembly 53' with an exciting current continuously variable with the detected vehicle speed. The fluid inlet port 80 of the valve assembly 53' constructed and arranged as hereinbefore described communicates with the fluid outlet port 38 of the pressure compensating valve assembly 30 through the previously mentioned fluid passageway 38a, while the fluid discharge port 81 of the pressure reducing valve assembly 53' communicates on one hand to a fluid reservoir 9' through the fluid discharge passageway 66 and on the other hand to the control fluid port 39 of the pressure compensating valve assembly 30 through the fluid feedback passageway 67.

When, now, the vehicle is cruising at a certain speed, an electric signal representative of the vehicle speed is supplied to the first signal input terminal 87a of the control circuit 87 and energizes the current-carrying coil unit 84 of the pressure reducing valve assembly 53' with a current variable in intensity with the vehicle speed. By reason of the magnetic interaction between the permanent magnet 85 and the current-carrying coil unit 84 thus energized, the coil unit 84 and accordingly the valve spool 82 are caused to axially move within the cavity 77 away from the end wall 78 against the force of the compression spring 86, providing communication between the fluid inlet and discharge ports 80 and 81. The valve spool 82 is thus axially moved from the initial axial position closing the fluid inlet port 80 a distance which is dictated by the intensity of the current supplied to the solenoid coil forming part of the coil unit 84. As the valve spool 82 is axially moved away from the inner face of the end wall 78, the fluid inlet port 80 is made open to a degree which is continuously variable with the axial displacement of the valve spool 82 in the cavity 77. Accordingly, the flow rate of fluid from the fluid inlet port 80 to the fluid discharge port 81 of the pressure reducing valve assembly 53' through the axial cavity 77 increases as the valve spool 82 is axially moved from the initial axial position toward the inner face of the end wall 79 and is, thus, continuously variable with the vehicle speed.

When the steering wheel and shaft and accordingly the stub shaft 5 are, under these conditions, driven to turn by a driver's manual steering effort applied to the steering wheel, the power piston 11 of the steering power cylinder assembly 4 is axially driven to move in either direction in and with respect to the steering gear housing 2 by the worm shaft 17. On the other hand, the turn of the steering wheel and shaft 5 establish a left-turn or right-turn driving condition in the steering pressure control valve assembly 3 so that the fluid pressure developed by the steering fluid feed pump 7 is directed through the fluid feed passageway 6 and the fluid inlet port 3a and further by way of one of the first and second control fluid ports 3c and 3d and one of the fluid passageways 22 and 23 to one of the first and second pressure-acting chambers 15 and 16 of the steering power cylinder assembly 4. The fluid pressure introduced into the first pressure-acting chamber 15 or the second pressure-acting chamber 16 acts axially on the steering power piston 11 to axially move within the steering gear housing 2 in the direction in which the power piston 11 is driven to move by the worm shaft 17 as in the embodiment described with reference to FIG. 1. The fluid pressure introduced into one of the first and second pressure-acting chambers 15 and 16 as above described is further passed through the fluid passageway 27 or 28, one-way check valve 31 and 32 and fluid passageway 29 to the fluid inlet port 37 of the pressure compensating valve assembly 30. The fluid pressure thus entering the valve assembly 30 from the fluid inlet port 37 is passed through the first pressure-acting chamber 44 and the first fluid passageway 49 to the fluid outlet port 38 and is distributed through the fluid passageways 50 and 51 to the second and third pressure-acting chambers 45 and 46, respectively, of the pressure compensating valve assembly 30 and further through the fluid passageway 38a to the fluid inlet port 80 of the pressure reducing valve assembly 53'. The fluid pressure directed by way of the fluid passageway 38a to the fluid inlet port 80 of the valve assembly 53' is passed to the fluid discharge port 81 at a rate variable with vehicle speed, with the valve spool 82 axially moved away from the end wall 78 against the force of the spring 86. The fluid pressure thus developed in the fluid discharge port 81 is on one hand discharged through the fluid discharge passageway 66 to the fluid reservoir 9' and is on the other hand fed back to the control fluid port 39 of the pressure compensating valve assembly 30 through the fluid feedback passageway 67 as in the embodiment described with reference to FIG. 1. The valve spool 40 is thus maintained in an equilibrium axial position in the cavity 34 when the difference between the fluid pressure in the fluid outlet port 38 and the fluid pressure in the control fluid port 39 of the pressure compensating valve assembly 30 or, in other words, the differential pressure between the fluid inlet and discharge ports 80 and 81 of the pressure reducing valve assembly 53', assumes a predetermined value dictated by the cross sectional area of the third circumferential land portion 43 of the valve spool 40 and the spring selected of the compression spring 52. Thus, the pressure compensating valve assembly 30 in the embodiment of FIG. 2 is also operative to continuously vary the fluid pressure in the fluid outlet port 38 thereof and accordingly in the fluid inlet port 80 of the pressure reducing valve assembly 53' in such a manner that the difference between the fluid pressure in the fluid inlet port 80 and the fluid pressure in the fluid discharge port 81 of the valve assembly 53' is maintained constant. The fluid pressure directed into one of the first and second pressure-acting chambers 15 and 16 of the steering power cylinder assembly 4 is discharged to the fluid reservoir 9' through the series combination of the valve assemblies 30 and 53'. The result is that the fluid pressure to be developed in one of the first and second pressure-acting chambers 15 and 16 of the steering power cylinder assembly 4 when the vehicle is being steered in either direction is reduced at a rate which varies proportionately with the vehicle speed represented by the signal supplied to the control circuit 87 through the first signal input terminal 87a of the circuit 87. In the embodiment shown in FIG. 2, the control circuit 87 predominant over the motions of the valve spool 82 of the pressure reducing valve assembly 53' is responsive to not only the vehicle speed but other operational conditions of the vehicle such as the torque manually applied to the steering wheel and shaft and the rate of acceleration to which the vehicle is subjected under the influence of a sidewind as previously noted. The fluid pressure to aid in the axial movement of the steering power piston 11 of the steering power cylinder assembly 4 is, thus, modified not only in response to variation in vehicle speed but to variation in each of such operational conditions of the vehicle. As will have been understood from the foregoing description, the fluid pressure to be developed in the fluid outlet port 38 of the pressure compensating valve assembly 30 in the embodiment of FIG. 2 is also variable independently of the fluid pressure developed in the fluid inlet port 37 so that the flow rate of the fluid to be discharged to the fluid reservoir 9' through the series combination of the valve assemblies 30 and 53' varies solely with the vehicle speed and the other operational conditions of the vehicle as above mentioned.

If, on the other hand, the vehicle speed represented by the signal fed to the control circuit 87 through the first signal input terminal 87a thereof is lower than the predetermined value, the valve spool 82 of the pressure reducing valve assembly 53' is held in the axial position fully closing the fluid inlet port 80 of the valve assembly 53'. When the valve spool 82 assumes such an axial position within the cavity 77, there is no fluid pressure developed in the fluid discharge port 81 of the valve assembly 53' and in the control fluid port 39 of the pressure compensating valve assembly 30. Under these conditions, both of the fluid passageways 27 and 28 are isolated from the fluid reservoir 9' irrespective of the axial position of the valve spool 40 in the pressure compensating valve assembly 30. The fluid pressure directed into one of the first and second pressure-acting chambers 15 and 16 of the steering power cylinder assembly 4 acts, without being modified or reduced, on the steering power piston 11 of the steering power cylinder assembly 4.

In the meantime, another type of fluid-operated control apparatus for a power-assisted steering system is known, an example of which is shown in FIG. 3 of the drawings. The prior-art control apparatus forms part of a vehicle steering system comprising a steering wheel and shaft assembly 88 which includes a steering shaft 89 carrying a steering wheel 90 and axially extending through a hollow steering column tube 91. The control apparatus comprises a steering gear unit 92 having a housing 93 including valve and cylinder housing portions 93a and 93b respectively having incorporated therein a steering pressure control valve assembly 94 and a steering power cylinder assembly 95 only portions of which are herein shown. The control valve assembly 94 is similar to the valve assembly 3 in each of the embodiments hereinbefore described with reference to FIGS. 1 and 2 and has fluid inlet and outlet ports 94a and 94b and first and second control fluid ports 94c and 94d. The steering shaft 89 is coupled to a pinion gear 96 forming part of the steering power cylinder assembly 95 which further comprises a toothed rack member 97 with which the pinion gear 96 is held in constant mesh. The rack member 97 is movable in the cylinder housing portion 93b and has a pair of longitudinal extensions in opposite directions from the toothed portion of the rack member 97, one of such extensions being indicated at 97a and having a steering power piston 98 fixedly mounted thereon. The power piston 98 forms in the housing portion 93b first and second pressure-acting chambers 99 and 100 across the power piston 98. The fluid inlet port 94a of the valve assembly 94 communicates through fluid feed passageways 101 and 101' with the delivery port of a steering fluid feed pump 102, while the fluid outlet port 94b of the valve assembly 94 communicates through a fluid discharge passageway 103 with a fluid reservoir 104 which further communicates with the suction port of the pump 102. On the other hand, the control fluid ports 94c and 94d of the valve assembly 94 communicate through control fluid passageways 105 and 106 to the above mentioned pressure-acting chambers 99 and 100, respectively, of the cylinder assembly 95.

Similar to its counterpart in each of the embodiments of FIGS. 1 and 2, the valve assembly 94 is shiftable between left-turn and right-turn driving conditions and a straight-ahead driving condition depending upon the rotational position of the steering shaft 89 about the center axis thereof. When the left-turn or right-turn driving condition is established in the valve assembly 94, the fluid inlet port 94a is permitted to communicate with one of the control fluid ports 94c and 94d while the fluid outlet port 94b is permitted to communicate with the other of the ports 94c and 94d. As a consequence, the pressurized fluid delivered from the pump 102 is supplied through the passageways 101 and 101' and by way of the fluid inlet port 94a and one of the control fluid ports 94c and 94d to the control fluid passageway 105 or 106 and enters one of the pressure-acting chambers 99 and 100. The fluid pressure thus admitted into one of the pressure-acting chambers 99 and 100 acts on the power piston 98 and urges the power piston 98 and accordingly the rack member 97 to axially move in a direction in which the rack member 97 is driven to move in the cylinder housing portion 93b by a driver's manual steering effort applied to the steering wheel and shaft assembly 88. Under these conditions, the other of the pressure-acting chambers 99 and 100 communicates through the other of the control fluid passageways 105 and 106, the other of the control fluid ports 94c and 94d and the fluid outlet port 94b of the valve assembly 94 and further through the fluid discharge passageway 103 with the fluid reservoir 104.

The prior-art apparatus shown in FIG. 3 further comprises a pressure regulator valve assembly 107 provided between the fluid feed passageways 101 and 101' and comprising a valve casing 108 formed with first, second and third axial cavities 109, 110 and 111. The first axial cavity 109 is elongated between an end plug member 112 fitted to one axial end portion of the valve casing 108 and an annular internal wall 113 of the valve casing 108. The annular internal wall 113 axially intervenes between the first and second axial cavities 109 and 110 and is formed with an orifice 114 providing restricted communication between the cavities 109 and 110. The valve casing 108 is further formed with fluid inlet and discharge ports 115 and 116 commonly open to the first axial cavity 109 and a fluid outlet port 117 open to the second axial cavity 110. The fluid feed passageway 101 leading from the delivery port of the steering fluid feed pump 102 terminates in the fluid inlet port 115, while the fluid feed passageway 101' leading to the fluid inlet port 94a of the pressure control valve assembly 94 originates in the fluid outlet port 117. The fluid discharge port 116 communicates through a fluid discharge passageway 118 with the fluid reservoir 104. Within the first axial cavity 109 is axially slidable a valve spool 119 which defines in the first axial cavity 109 first and second pressure-acting chambers 120 and 121 across the valve spool 119 and which is formed with a number of axial grooves 122.

The valve spool 119 is further formed with an axial bore 123 open toward the end plug member 112 and a radial opening 124 leading from the axial bore 123 and terminating at the outer peripheral surface of the valve spool 119. The radial opening 124 is open to the fluid discharge port 116 when the valve spool 119 is held in or located in the neighborhood of the axial position covering the port 116. The valve spool 119 is urged to move toward such an axial position by a helical compression spring 125 seated between the valve spool 119 and the end plug member 112. The axial bore 123 in the valve spool 119 is closed by an end plug member 126 fitted to the valve spool 119. The end plug 126 is formed with an axial bore 127 for providing communication between the pressure-acting chamber 121 and the axial bore 123 in the valve spool 119. A spherical valve element 128 is located within the axial bore 123 in the valve spool 119 and is urged by a helical compression spring 129 to be seated on the inner end face of the plug member 126 for closing the axial bore 127. Constant communication is established between the second cavity 110 and 121 through a fluid feedback passageway 130 also formed in the valve casing 108.

The pressure regulator valve assembly 107 further comprises a solenoid assembly 131 including a plunger 132 axially movable within the third axial cavity 111 and a cylindrical coil unit 133 surrounding the plunger 132. An elongated flow regulating valve member 134 having a tapered leading end portion projects from the plunger 132 into the second axial cavity 110. The plunger 132 is urged to axially move toward the second axial cavity 110 by a helical compression spring 135 seated between the plunger 132 and an end wall of the valve casing 108. When the plunger 132 is axially moved in the third axial cavity 111 in a direction in which the valve member 134 axially protrudes toward the valve spool 119 through the orifice 114, the annular open area formed around the tapered leading end portion of the valve member 134 continuously varies with the axial movement of the valve member 134 through the orifice 114. When the valve spool 119 is held in the axial position isolating the fluid inlet and discharge ports 115 and 116 from each other as shown, the fluid pressure delivered from the pump 102 to the fluid feed passageway 101 enters the first pressure-acting chamber 120 through the fluid inlet port 115. The fluid pressure thus developed in the first pressure-acting chamber 120 urges the valve spool 119 to move away from the orifice 114 and is partially admitted into the second axial cavity 110 at a rate dictated by the annular open area formed around the tapered leading end portion of the valve member 134. The fluid pressure admitted into the axial cavity 110 is partially fed through the fluid feed passageway 101' to the fluid inlet port 94a of the steering pressure control valve assembly 94 and partially directed through the fluid feedback passageway 130 into the second pressure-acting chamber 121, urging the valve spool 119 and the plug member 126 to move away from the plug member 112. If, in this instance, the fluid pressure developed in the first pressure-acting chamber 120 is excessively high as compared with the fluid pressure developed in the second pressure-acting chamber 121, the valve spool 119 is moved to an axial position providing communication between the fluid inlet and discharge ports 115 and 116 through the grooves 122 in the valve spool 119 so that the pressurized fluid admitted into the pressure-acting chamber 120 is partially discharged through the port 116 and by way of the fluid discharge passageway 118 to the fluid reservoir 104. The valve spool 119 is thus constantly held in an equilibrium axial position within the first axial cavity 109, maintaining a fixed differential pressure between the pressure-acting chambers 120 and 121 and accordingly between the first pressure-acting chamber 120 and the second axial cavity 110. If the fluid pressure in the second axial cavity 110 and accordingly in the second pressure-acting chamber 121 becomes excessively high as compared with the fluid pressure developed in the first pressure-acting chamber 120, the fluid pressure acting on the spherical valve element 128 through the axial bore 127 in the end plug 126 causes the valve element 128 to be unseated from the inner end face of the plug member 126, allowing the fluid pressure to be discharged from the pressure-acting chamber 121 to the fluid reservoir 104 through the axial bore 123 and radial opening 124 in the valve spool 119 and through the fluid discharge port 116 and the fluid discharge passageway 118.

During operation of the prior-art control apparatus thus constructed and arranged, the flow regulating valve member 134 is subjected to either the fluid pressure developed in the second axial cavity 110 or the pressure of the fluid being passed into the axial cavity 110 through the orifice 114 and, for this reason, the plunger 132 is axially urged to move against the spring 135 within the third axial cavity 111. Furthermore, the solenoid assembly 131 is required to be capable of correctly regulating the flow rate of fluid through the orifice 114 not only when the fluid pressure admitted into the first pressure-acting chamber 120 is partially discharged through the fluid discharge port 116 but when the fluid pressure entering the pressure-acting chamber 120 is totally passed through the orifice 114. For these reasons, the solenoid assembly 131 must be designed and constructed to be capable of reliably coping with the maximum fluid pressure to be delivered from the pump 102 and the maximum effective flow rate of fluid through the orifice 114. The solenoid assembly 131 to satisfy these requirements inevitably has a disproportionately large-sized construction which results in an accordingly large-sized overall construction of the pressure regulator valve assembly 107 as a whole.

When, furthermore, the steering wheel 90 is being turned in either direction from the straight-ahead position thereof, the fluid inlet port 94a of the pressure control valve assembly 94 is brought into communication with one of the control fluid ports 94c and 94d and accordingly with one of the pressure-acting chambers 99 and 100 of the valve assembly 95. The fluid pressure passed through the orifice 114 and by way of the second axial cavity 110 and fluid outlet port 117 to the fluid feed passageway 101' and thus directed through the passageway 101' to the fluid inlet port 94a of the valve assembly 94 is therefore caused to rise and develop a steering assistance fluid pressure in the particular one of the pressure-acting chambers 99 and 100 of the steering power cylinder assembly 95. Because, in this instance, of the fact that the flow rate of the fluid passed through an orifice 114 varies in direct proportion to the square root of the differential pressure developed across the orifice, the fluid pressure directed into the pressure-acting chamber 99 or 100 can not immediately reach the proper level by actuation of the solenoid assembly 131 which is energized to increase the effective open area of the orifice 114. Thus, the steering power cylinder assembly 95 is responsive at a retarded timing to the vehicle driver's manipulative effort applied to the steering wheel 90 when the vehicle is to make a leftward or rightward turn from the straight-ahead condition thereof.

The present invention further contemplates elimination of these drawbacks of a prior-art fluid-operated control apparatus of the general nature hereinbefore described. FIG. 4 of the drawings shows a preferred embodiment of the present invention to accomplish such an end. The fluid-operated control apparatus herein shown features the combination of a valve assembly similar to the pressure regulator valve assembly 107 and valve assemblies essentially similar to the pressure compensating and reducing valve assemblies 30 and 53, respectively, in the embodiment shown in FIG. 1 or the pressure compensating and reducing valve assemblies 30 and 53', respectively, in the embodiment shown in FIG. 2.

In the embodiment shown in FIG. 4, the steering gear unit connected to the steering wheel and shaft assembly is assumed as being similar to the integral rack-and-pinion steering gear unit 92 of the prior-art control apparatus described with reference to FIG. 3. The steering gear unit, also designated in its entirety by reference numeral 92 in FIG. 4, is thus provided in association with a steering wheel and shaft assembly 88 and largely consists of a steering pressure control valve assembly 94 and a steering power cylinder assembly 95 which are constructed and arranged similarly to their respective counterparts in the prior-art apparatus of FIG. 3. Thus, it is apparent that the rack-and-pinion steering gear unit 92 in the embodiment of FIG. 4 can be substituted by a steering gear unit similar to the recirculating-ball steering gear unit in each of the embodiments of FIGS. 1 and 2, if desired.

In the embodiment shown in FIG. 4, furthermore, the fluid inlet port 94a of the steering pressure control valve assembly 94 communicates through fluid feed passageways 101 and 101' with the delivery port of a steering fluid feed pump 102 constituting fluid displacement means in the embodiment of the present invention, while the fluid outlet port 94b of the valve assembly 94 communicates through a fluid discharge passageway 103 with suitable fluid storage means such as a fluid reservoir 104 which further communicates with the suction port of the fluid feed pump 102. The pump 102 is usually belted, geared or otherwise operatively connected to the output shaft of the internal combustion engine (not shown) installed on the vehicle. On the other hand, the first and second control fluid ports 94c and 94d of the valve assembly 94 communicate through control fluid passageways 105 and 106 to the first and second pressure-acting chambers 99 and 100, respectively, of the steering power cylinder assembly 95.

The control apparatus embodying the present invention as shown in FIG. 4 comprises, in addition to the steering gear unit 92 arranged as above described, a pressure regulator valve assembly 136 which is provided between the fluid feed passageways 101 and 101'. The pressure regulator valve assembly 136 comprises a generally cylindrical valve casing 108 formed with first and second axial cavities 109 and 110 axially aligned with each other in the valve casing 108. The first axial cavity 109 is elongated between an end plug member 112 which is securely or adjustably fitted to one axial end portion of the valve casing 108 and an annular internal wall 113 of the casing 108. The annular internal wall 113 axially intervenes between the first and second axial cavities 109 and 110 and is formed with a flow restriction passageway constituted by an orifice 114 providing restricted communication between the first and second axial cavities 109 and 110. The valve casing 108 is further formed with fluid inlet and discharge ports 115 and 116 commonly open to the first axial cavity 109 and a fluid outlet port 117 open to the second axial cavity 110. The fluid feed passageway 101 leading from the pump 102 terminates in the fluid inlet port 115, while the fluid feed passageway 101' leading to the fluid inlet port 94a of the previously mentioned steering pressure control valve assembly 94 originates in the fluid outlet port 117. On the other hand, the fluid discharge port 116 communicates through a fluid discharge passageway 118 with the fluid reservoir 104.

Within the first axial cavity 109 is axially slidable a generally cylindrical valve spool 119 forming in the first axial cavity 109 first and second pressure-acting chambers 120 and 121 across the valve spool 119. The valve spool 119 has, in the neighborhood of the annular internal wall 113, an axial end portion formed with axial grooves 122 in its outer peripheral wall. The valve spool 119 is movable in the first axial cavity 109 between a first axial position close to the annular internal wall 113, in which it allows the fluid inlet port 115 to be open to the grooves 122 in the spool 119 while covering the fluid discharge port 116 as shown and a second axial position axially remote from the annular internal wall 113, in which it provides communication between the fluid inlet and discharge ports 115 and 116 through the grooves 122 in the valve spool 119.

The valve spool 119 is further formed with an axial bore 123 which is open at one end thereof toward the end plug member 112 and a radial opening 124 leading from the axial bore 123 and terminating at the outer peripheral surface of the valve spool 119 as shown. The radial opening 124 is open to the fluid discharge port 116 when the valve spool 119 is held in or located in the neighborhood of the first axial position thereof in the first axial cavity 109 as shown. The valve spool 119 is urged to move toward the first axial position thereof by suitable a biasing means, which is shown comprising a preloaded helical compression spring 125 seated between the annular outer end face of the valve spool 119 and the inner face of the end plug member 112. The axial bore 123 in the valve spool 119 is elongated between an internal end face of the valve spool 119 and an end plug member 126 securely or adjustably fitted to a hollow cylindrical end portion of the valve spool 119. The end plug 126 is formed with an axial bore 127 which is open at one end thereof the the axial bore 123 in the valve spool 119 and at the other end thereof to the second pressure-acting chamber 121 forming part of the first axial cavity 109 as shown. The second pressure-acting chamber 121 is thus communicable with the axial bore 123 in the valve spool 119 through the axial bore 127 in the plug member 126. Such communication between the pressure-acting chamber 121 and the axial bore 123 is normally blocked by a spherical valve element 128 located within the axial bore 123 in the valve spool 119 and urged by suitable biasing means. In the embodiment herein shown, such biasing means is assumed to comprise a preloaded helical compression spring 129 which is seated at one end thereof on the spherical valve element 128 and at the other end thereof on the above mentioned internal end face of the valve spool 119. The first pressure-acting chamber 120 is formed and axially variable in volume between the valve spool 119 and the annular internal wall 113 while the second pressure-acting chamber 121 is formed and axially variable in volume between the plug member 121 and the plug member 126. The second pressure-acting chamber 121 constantly communicates with the first pressure-acting chamber 120 through a fluid feedback passageway 130 formed in the valve casing 108.

The apparatus embodying the present invention as shown in FIG. 4 further comprises a combination of pressure compensating and reducing valve assemblies 137 and 138 which are arranged in series with each other in a common valve casing 139. These pressure valve assemblies 137 and 138 are essentially similar in construction and arrangement to the valve assemblies 30 and 53', respectively, in the embodiment of FIG. 2. The valve casing 139 has a first casing portion 139a having the pressure compensating valve assembly 137 incorporated therein and a second casing portion 139b having the pressure reducing valve assembly 138 incoporated therein. The first casing portion 139a is formed with an axial cavity 34 axially elongated between the respective inner faces of opposite end walls 35 and 36 of the casing portion 139a and further with a fluid inlet port 37, a fluid outlet port 38 and a control fluid port 39. The pressure compensating valve assembly 137 is similar in function to its counterpart in each of the embodiments described with reference to FIGS. 1 and 2 and includes a valve spool 40 having first, second and third circumferential land portions 41, 42 and 43 which are shaped and arranged similarly to their respective counterparts of the valve spool 40 in the valve assembly 30 in each of the embodiments of FIGS. 1 and 2. The first and second circumferential land portions 41 and 42 are thus axially spaced apart from each other and thereby form therebetween a circumferential groove which forms part of a first pressure-acting chamber 44 in the casing portion 139a. The first circumferential land portion 41 is located adjacent the inner face of the end wall 35 and forms a second pressure-acting chamber 45 between the outer end face thereof and the inner face of one end wall 35. The second and third circumferential land portions 42 and 43 are formed axially adjacent each other and form an annular third pressure-acting chamber 46 encircling at least an axial portion of the second circumferential land portion 42 and a fourth pressure-acting chamber 47 between the outer end face of the third circumferential land portion 43 and the inner face of the other end wall 36. The casing portion 139a is further formed with an internal circumferential groove 48 forming part of the first pressure-acting chamber 44 between the land portions 41 and 42 and being larger in sectional area than the remaining portion of the chamber 44. The fluid inlet port 37 is directly open to the internal circumferential groove 48 and communicates with a passageway 140 branched from the fluid feed passageway 101'. The fluid outlet port 38 is open directly to the first pressure-acting chamber 44 and communicates with the second and third pressure-acting chambers 46 and 47 through fluid passageways 50 and 51, respectively, in the casing portion 139a. Furthermore, the control fluid port 39 is open to the fourth pressure-acting chamber 47. The valve spool 40 is axially movable in the axial cavity 34 away from the inner face of the end wall 35 to close the internal circumferential groove 48 forming part of the first pressure-acting chamber 44. The valve spool 40 is urged to axially move toward the inner face of the end wall 35, viz., in a direction to have the second and fourth pressure-acting chambers 45 and 47 axially contracted and expanded, respectively, by suitable biasing means. In the embodiment herein shown, such biasing means is assumed as comprising a preloaded helical compression spring 52 seated between the inner face of the end wall 36 and the outer end face of the third circumferential land portion 43 of the valve spool 40.

On the other hand, the second casing portion 139b is formed with first and second axial cavities 77 and 77' axially arranged in series between opposite end walls 78 and 79 and partitioned from each other by an annular internal partition wall 141 forming part of the casing portion 139b. The casing portion 139b is further formed with fluid inlet and discharge ports 80 and 81 radially open to the first axial cavity 77 and slightly offset from each other axially of the casing portion 139b. The fluid inlet port 80 communicates with the fluid outlet port 38 of the pressure compensating valve assembly 137 through a fluid passageway 38a while the fluid discharge port 81 in the casing portion 139b communicates through a passageway 142 branched from the fluid discharge passageway 103. Furthermore, the first axial cavity 77 is held in constant communication with the fourth pressure-acting chamber 47 through a fluid feedback passageway 39a also formed in the valve casing 139.

The pressure reducing valve assembly 138 further comprises a valve spool 82 axially slidable in the first axial cavity 77 between the end wall 78 and above mentioned annular internal partition wall 141. The valve spool 82 has an axial extension extending through the opening in the partition wall 141 into the second axial cavity 77' and securely connected at its leading end to a ferromagnetic plunger 85'. The plunger 85' is axially movable within the second axial cavity 77' and forms part of solenoid-operated spool actuating means which further comprises a cylindrical current-carrying coil unit 84' fixedly embedded in the casing portion 139b in coaxially surrounding relationship to the second axial cavity 77'. The solenoid-operated spool actuating means is operative so that the plunger 85' and accordingly the valve spool 82 are caused to axially move within the second and first axial cavities 77' and 77, respectively, away from the end wall 78 by the magnetic interaction between the coil unit 84' and the permanent magnet 85' when the coil unit 84' is electrically energized. The valve spool 82 and accordingly the plunger 85' are urged by suitable biasing means for axial movement toward the end wall 78 within the cavities 77 and 77', respectively. In FIG. 4, such biasing means is shown comprising a preloaded helical compression spring 86' seated between the partition wall 141 and the inner end face of the valve spool 82 as shown. When the coil unit 84' remains de-energized, the valve spool 82 is held in an axial position at least partially closing the fluid inlet port 80 by the force of the compression spring 86'. Under these conditions, communication is blocked or at least a minimum degree of communication is provided between the fluid inlet and discharge ports 80 and 81. When the coil unit 84' is electrically energized, the plunger 85' is axially moved away from the partition wall 141 and, as a consequence, the valve spool 82 is axially moved toward the partition wall 141 against the compression spring 86'. As the valve spool 82 is moved in this direction within the first axial cavity 77, the fluid inlet port 80 is made fully or partially uncovered by the valve spool 82. The solenoid coil 84' has terminals connected across a suitable driver circuit 143 to a suitable sensor 144 operative to detect vehicle speed and produce an output signal variable with the detected vehicle speed. The ports 80 and 81 are formed and arranged so that the flow rate of fluid from the fluid inlet port 80 to the fluid discharge port 81 continuously decreases and increases as the valve spool 82 is axially moved respectively toward and away from the end wall 78 with the electric current from the driver circuit 143.

When, now, the internal combustion engine of the vehicle is in operation driving the steering fluid feed pump 102, a pressurized fluid is delivered from the pump 102 at a flow rate which is variable in direct proportion to the output speed of the engine. The pressurized fluid is directed through the fluid feed passageway 101 to the first pressure-acting chamber 120 through the fluid inlet port 115 of the pressure regulator valve assembly 136 and develops a fluid pressure $P_1$ in the pressure-acting chamber 120. The fluid pressure $P_1$ thus developed in the pressure-acting chamber 120 urges the valve spool 119 to axially move away from the orifice 114 and is partially admitted into the second axial cavity 110 at a rate dictated by the cross sectional area (herein denoted as A) of the orifice 114 in the annular internal wall 113. The pressurized fluid admitted into the axial cavity 110 develops a fluid pressure $P_2$ therein and is partially discharged through the fluid outlet port 117 to the fluid feed passageway 101' and partially directed through the fluid feedback passageway 130 into the second pressure-acting chamber 121. The fluid pressure $P_2$ is thus also developed in the pressure-acting chamber 121 and urges the valve spool 119 and the plug member 126 to axially move away from the plug member 112. Under these conditions, the volumetric flow Q of the pressurized fluid from the first pressure-acting chamber 120 into the second axial cavity 110 through the orifice 114 is given in terms of the pressure drop $\Delta P$ ($=P_1-P_2$) by the following equation:

$$Q = C \cdot A \sqrt{\frac{2g(P_1 - P_2)}{d}},$$

where C is a constant, g is the acceleration due to gravity, and d is the density of the fluid. From this equation it will be seen that the volumetric flow rate Q of fluid through the orifice 114 varies in direct proportion to the square root of the differential pressure $\Delta P$ ($=P_1-P_2$) across the orifice 114 if the cross sectional area A of the orifice 114 is fixed. If, on the other hand, the differential pressure $\Delta P$ across the orifice 114 is given as a fixed value, then the volumetric flow rate Q of fluid through the orifice 114 varies in direct proportion to the cross sectional area A of the orifice 114. If, furthermore, both the differential pressure $\Delta P$ across the orifice 114 and the cross sectional area A of the orifice 114 are fixed, the flow rate Q of fluid through the orifice 114 becomes constant.

If, in this instance, the force resulting from the fluid pressure $P_1$ overcomes the sum of the force of the compression spring 125 and the force resulting from the fluid pressure $P_2$, the valve spool 119 is axially moved away from the annular internal wall 113 to an axial position providing communication between the fluid inlet and discharge ports 115 and 116 through the grooves 122 in the valve spool 119 so that the pressurized fluid admitted into the pressure-acting chamber 120 is partially discharged through the port 116 and by way of the fluid discharge passageway 118 to the fluid reservoir 104. As the output speed of the engine increases with a consequent rise in the fluid pressure $P_1$ in the first pressure-acting chamber 120, the valve spool 119 is further moved axially away from the orifice 114 and increases the degree to which the fluid discharge port 116 is allowed to be open to the pressure-acting chamber 120 through the grooves 122 in the valve spool 119, increasing the flow rate of the fluid to be discharged through the fluid discharge port 116. The valve spool 119 is, in this fashion, constantly held in an equilibrium axial piston within the first axial cavity 109 and is operative to maintain the fixed differential pressure $\Delta P$ between the pressure-acting chambers 120 and 121 and accordingly between the first pressure-acting chamber 120 and the second axial cavity 110 since the orifice 114 has the fixed cross sectional area A. It will be apparent that the differential pressure $\Delta P$ across the orifice 114 is maintained constant also when the output speed of the engine and accordingly the pressure $P_1$ of the fluid delivered from the pump 102 are reduced. If the fluid pressure in the second axial cavity 110 and accordingly in the second pressure-acting chamber 121 becomes excessively high as compared with the fluid pressure in the first pressure-acting chamber 120 when the fluid pressure in the fluid feed passageway 101' becomes excessively high as compared with the fluid pressure delivered from the pump 102, the fluid pressure acting on the spherical valve element 128 through the axial bore 127 causes the spherical valve element 128 to be unseated from the inner end face of the plug member 126 against the force of the compression spring 129, allowing the fluid pressure to be discharged from the pressure-acting chamber 121 to the fluid reservoir 104 through the axial bore 123, the radial opening 124 and the fluid discharge port 116 and further by way of the fluid discharge passageway 118. The spherical valve element 128 the spring 129, the bore 123, the radial opening 124 and the axial bore 127 thus constitute pressure relief valve means in the pressure regulator valve assembly 107.

As will have been understood from the foregoing description, the differential pressure across the orifice 114 is maintained fixed even when the fluid pressure supplied from the pump 102 to the valve assembly 136 is changed. The volumetric flow of the fluid passed from the fluid feed passageway 101 to the fluid feed passageway 101' through the valve assembly 136 is thus maintained substantially constant irrespective of the output speed of the engine, viz., the pressure of the fluid delivered from the steering fluid feed pump 102. The pressurized fluid discharged from the fluid outlet port 117 of the valve assembly 137 is directed through the fluid feed passageway 101' to the fluid inlet port 94a of the steering pressure control valve assembly 94 and through the branch passageway 140 to the fluid inlet port 37 of the pressure compensating valve assembly 137. The increased fluid pressure $P_2$ is thence passed through the first pressure-acting chamber 44 to the fluid outlet port 38 and is distributed through the fluid passageways 50 and 51 to the second and third pressure-acting chambers 45 and 46, respectively, and further through the fluid passageway 38a to the fluid inlet port 80 of the pressure reducing valve assembly 138. The fluid pressure passed to the fluid inlet port 80 of the valve assembly 136 is directed to the control fluid port 39 of the pressure compensating valve assembly 137 and enters the fourth pressure-acting chamber 47 and acts upon the outer end face of the third circumferential land portion 43 of the valve spool 40 as previously discussed in regard to the embodiment shown in FIG. 1. On the other hand, the valve spool 40 of the valve assembly 137 is urged to axially move toward the end wall 36 of the casing portion 139a by the force resulting from the fluid pressure acting on the outer end face of the first circumferential land portion 41 of the valve spool 40 from the second pressure-acting chamber 45 and the force resulting from the fluid pressure acting on the annular inner end face of the third circumferential land portion 43 from the third pressure-acting chamber 46. The valve spool 40 is further urged to axially move in the opposite direction by the force of the compression spring 52 and the force resulting from the fluid pressure acting on the outer end face of the third circumferential land portion 43 of the valve spool 40 from the fourth pressure-acting chamber 47. The valve spool 40 is thus operative to vary the clearance formed by the internal circumferential groove portion 48 of the first pressure-acting chamber 44 and the inner circumferential edge of the first circumferential land portion 41 of the valve spool 40. In this fashion, the valve spool 40 attempts to maintain an equilibrium axial position in the axial cavity 34 when the differential pressure developed between the fluid outlet port 38 and the control fluid port 39 of the valve assembly 137 assumes a predetermined value dictated by the cross sectional area of the third circumferential land portion 43 of the valve spool 40 and the spring constant selected of the compression spring 52. The pressure compensating valve assembly 137 is thus operative to continuously vary the fluid pressure in the fluid outlet port 38 in such a manner that the difference between the fluid pressure in the fluid inlet port 37 and the fluid pressure in the fluid outlet port 38 is maintained constant.

When, now, the steering wheel 90 is driven to turn by a driver's manual steering effort applied thereto, the power piston 98 and the toothed rack member 97 of the steering power cylinder assembly 95 are axiallly driven to move in either direction in the cylinder housing portion 93b of the steering gear housing 93 by the pinion gear 96. The turn of the steering wheel 90 further establishes a left-turn or right-turn driving condition in the steering pressure control valve assembly 94 of the steering gear unit 92 so that the above mentioned fluid pressure $P_2$ developed in the fluid feed passageway 101' attempts to rise by a certain value $\Delta P'$. The increased fluid pressure $P_3$ ($=P_2+\Delta P'$) developed in the fluid feed passagewway 101' is directed through the branch passageway 140, the fluid inlet port 37 of the pressure compenating valve assembly 137 and the first pressure-acting chamber 44 to the fluid outlet port 38 and is distributed through the fluid passageways 50 and 51 to the second and third pressure-acting chambers 45 and 46, respectively, and through the fluid passageway 38a and the fluid inlet port 80 of the pressure reducing valve assembly 138 to the fourth pressure-acting chamber 47 of the pressure compensating valve assembly 137, as above described. The fluid pressure $P_3$ entering the pressure-acting chambers 45 and 46 causes the valve spool 40 to axially move in the axial cavity 34 against the force of the spring 52 in a direction to reduce the degree to which the fluid inlet port 37 is allowed to be open to the first pressure-acting chamber 44. Such an axial movement of the valve spool 40 results in reduction of the fluid pressure in the first pressure-acting chamber 44 to a level approximating the initial level $P_2$, with the result that the differential pressure between the fluid inlet and outlet ports 37 and 38 of the valve assembly 137 is invariably maintained constant. In the event that there is caused a drop in the fluid pressure in the fluid feed passageway 101'the forces urging the valve spool 40 to axially move in the direction to reduce the fluid pressure in the first pressure-acting chamber 44 is overcome by the sum of the force of the spring 52 and the force resulting from the fluid pressure developed in the fourth pressure-acting chamber 47 of the valve assembly 137. Under these conditions, the valve spool 40 is caused to axially move in the axial cavity 34 with the aid of the force of the spring 52 in a direction to increase the degree to which the fluid inlet port 37 is allowed to be open to the first pressure-acting chamber 44. Such a movement of the valve spool 40 results in an increase in the fluid pressure in the first pressure-acting chamber 44 to a level also approximating the initial level $P_2$.

When the vehicle is cruising at a certain speed, the sensor 144 detects the vehicle speed and produces an electric output signal representative of the detected vehicle speed. The output signal thus produced by the sensor 144 is fed to the driver circuit 143, which is thus actuated to energize the current-carrying coil unit 84' of the pressure reducing valve assembly 138 with a current variable in intensity with the vehicle speed. By reason of the magnetic interaction between the permanent magnet 85' and the current-carrying coil unit 84' thus energized, the plunger 85' and accordingly the valve spool 82 are caused to axially move within the first and second axial cavities 77 and 77', respectively, away from the end wall 78 against the compression spring 86'. The valve spool 82 is thus caused to axially move from the initial axial position fully or almost fully closing the fluid inlet port 80 a distance dependent on the intensity of the current supplied to the coil unit 84'. As the increased vehicle speed is detected by the sensor 144 and consequently the coil unit 84' is energized with an increasing current, the degree to which the fluid inlet port 80 is allowed to communicate with the fluid discharge port 81 continuously increases with the axial displacement of the valve spool 82 in the cavity 77. In this instance, the differential pressure between the fluid inlet and outlet ports 37 and 38 of the pressure compensating valve assembly 137 or, in other words, the difference between the fluid pressure in the fluid inlet port 37 of the pressure compensating valve assembly 137 and the fluid pressure in the fluid inlet port 80 of the pressure reducing valve assembly 138 remains constant irrespective of changes, if any, in the fluid pressure developed in and the flow rate of fluid through the fluid feed passageway 101' as previously discussed. As a consequence, the fluid passed from the fluid outlet port 38 of the pressure compensating valve assembly 137 to the fluid inlet port 80 of the pressure reducing valve assembly 138 is directed to the fluid discharge port 81 of the valve assembly 138 at a rate which increases with an increase in the degree to which the fluid inlet port 80 is allowed to communicate with the fluid discharge port 8. If, conversely, the decreased vehicle speed is detected by the sensor 144 and consequently the coil unit 84' is energized with a decreasing current, the degree to which the fluid inlet port 80 is allowed to communicate with the fluid discharge port 81 continuously decreases with the axial displacement of the valve spool 82 in the cavity 77. Under these conditions, the fluid passed from the fluid outlet port 38 of the pressure compensating valve assembly 137 to the fluid inlet port 80 of the pressure reducing valve assembly 138 is directed to the fluid discharge port 81 of the valve assembly 138 at a rate which decreases with a decrease in the degree to which the fluid inlet port 80 of the valve assembly 138 is allowed to communicate with the fluid discharge port 81. From the foregoing description, it will have been understood that the pressurized fluid passed at the fixed rate Q through the pressure regulator valve assembly 136 is discharged through the series combination of the pressure compensating and reducing valve assemblies 137 and 138 at a rate continuously varying with the vehicle speed when the vehicle is being steered. During steering of the vehicle, therefore, the hydraulic power assistance available in the steering gear unit 92 is regulated to vary substantially in inverse proportion to vehicle speed and thus enables the vehicle driver to have the feeling of the reaction from the road wheels being steered.

When, on the other hand, the steering wheel 90 is left in the straight-ahead angular position, a straight-ahead or neutral riving condition is established in the steering pressure control valve assembly 94. Under these conditions, communication is provided between the fluid inlet and outlet ports 94a and 94b of the valve assembly 94 so that the fluid pressure delivered from the steering fluid feed pump 102 through the fluid feed passageway 101, the pressure regulator valve assembly 136 and the fluid feed passageway 101' to the fluid inlet port 94a of the steering pressure control valve assembly 94 is circulated through the fluid outlet port 94b of the valve assembly 94 and the fluid discharge passageway 103 to the fluid reservoir 104 without being supplied to the pressure-acting chambers 99 and 100 of the steering power cylinder assembly 95.

What is claimed is:

1. A fluid-operated control apparatus for a power-assisted steering system for a steerable vehicle, comprising:
    signal generating means for producing a signal representive of vehicle speed,
    fluid storage means adapted to have fluid stored therein,
    fluid-displacement means operative to suck in fluid from the fluid storage means and deliver fluid under pressure,
    a steering wheel and shaft assembly rotatable about an axis therethrough,
    a steering pressure control valve assembly responsive to turning motion of said steering wheel and shaft assembly and having a fluid inlet port communicable with said fluid-displacement means, a fluid outlet port communicating with said fluid storage means, and first and second control fluid ports, the valve assembly being shiftable between conditions having the fluid inlet port held in communication with one of said first and second control fluid ports and having said fluid outlet port held in communication with the other of the first and second control fluid ports and a condition having the fluid inlet and outlet ports held in communication with each other,
    a steering power cylinder assembly comprising a housing and a piston operatively connected to said wheel and shaft assembly and movable in the housing for having formed therein first and second pressure-acting chambers separate from each other across the power piston and communicating with said first and second control fluid ports, respectively,
    a pressure compensating valve assembly which is formed with a fluid inlet port communicable with each of said pressure-acting chambers of said cylinder assembly, a fluid outlet port and a control fluid port and which comprises a valve member movable for continuously varying the degree of communication between the fluid inlet and outlet ports of the valve assembly, said valve member having pressure-acting areas to be subjected to fluid pressures in first and second directions opposite to each other, the fluid pressure in the fluid inlet port being variable with the pressure of the fluid delivered from said fluid-displacement means and urging the valve member for movement in the first direction and a biasing element urging said valve member to move in the second direction, and
    a pressure reducing valve assembly which is formed with a fluid inlet port communicating with the fluid outlet port of said pressure compensating valve assembly and a fluid discharge port communicating with said fluid storage means and with the control fluid port of said pressure compensating valve assembly for urging said valve member for movement and which comprises a valve member movable for continuously varying the degree of communication between the fluid inlet and discharge ports of the pressure reducing valve assembly, the fluid pressure in the fluid discharge port being directed into said control fluid port and developing therein said fluid pressure urging said valve member of the pressure compensating valve assembly for movement in said second direction, the valve member of the pressure reducing valve assembly being responsive to said signal and being moved in a direction to vary the degree of communication between the fluid inlet and discharge ports of the pressure reducing valve assembly in response to said signal.

2. A fluid-operated control apparatus as set forth in claim 1, further comprising a pressure regulator valve assembly which is formed with first and second cavities, a flow restriction passageway formed between the cavities, a fluid inlet port open to the first cavity and communicating with said fluid-displacement means, a fluid discharge port open to the first cavity and communicating with said fluid storage means and a fluid outlet port open to the second cavity and communicating with the fluid inlet port of said pressure compensating valve assembly and the fluid inlet port of said steering pressure control valve assembly and which comprises a valve member movable in the first cavity and having formed in the first cavity first and second pressure-acting chambers thereacross, the first pressure-acting chamber communicating with said second cavity and the pressure regulator valve assembly being further formed with a passageway providing constant communication between said second cavity and second pressure-acting chamber, said valve member of the pressure regulator valve assembly being movable in the first cavity for continuously varying the degree of communication between the fluid inlet and discharge ports through the first cavity and providing a constant flow rate of fluid from the first pressure-acting chamber to the second cavity through said flow restriction passageway.

3. A fluid-operated control apparatus as set forth in claim 2, in which said pressure regulator valve assembly further comprises relief valve means operative to allow fluid from the second pressure-acting chamber to said fluid discharge port of the pressure regulator valve assembly in response to an excess of fluid pressure developed in said second pressure-acting chamber.

4. A fluid-operated control apparatus as set forth in claim 1, in which said vehicle is equipped with an engine and in which said fluid-displacement means is operative to develop a fluid pressure variable with the output speed of the engine.

5. A fluid-operated control apparatus as set forth in claim 1, in which said signal generating means comprises a variable-displacement pump operative to generate fluid pressure variable with vehicle speed and in which said pressure reducing valve assembly is further formed with a control fluid port communicating with said pump so that the fluid pressure developed by the pump is directed into the pressure reducing valve assembly through the control fluid port of the valve assembly and urges the valve member of the pressure reducing valve assembly for movement in a direction to vary the degree of communication between the fluid inlet and discharge ports of the pressure reducing valve assembly.

6. A fluid-operated control apparatus as set forth in claim 5, in which said valve member has an axial portion tapered so that the degree of communication between the fluid inlet and discharge ports of the pressure reducing valve assembly increases with an increase in the vehicle speed represented by the fluid pressure developed in said control fluid port of the pressure reducing valve assembly.

7. A fluid-operated control apparatus as set forth in claim 1, in which said first and second pressure acting chambers communicate with the fluid inlet port of said pressure compensating valve assembly through passageways, respectively, each provided with valve means adapted to provide one-way communication from each of said first and second pressure-acting chambers toward the fluid inlet port of the pressure compensating valve assembly.

8. A fluid-operated control apparatus as set forth in claim 2, further comprising a fluid feed passageway leading from said fluid outlet port of the pressure regulating valve assembly to said fluid inlet port of the steering pressure control valve assembly and a fluid discharge passageway leading from said fluid outlet port of the steering pressure control valve assembly to said fluid storage means, said inlet port of the pressure compensating valve assembly communicating with the fluid feed passageway and said fluid discharge port of the pressure reducing valve assembly communicating with the fluid discharge passageway.

9. A fluid-operated control apparatus as set forth in claim 1, in which said steering power cylinder assembly further comprises first and second fluid ports formed in said housing and open to said first and second pressure-acting chambers, respectively, and further comprising fluid passageways leading from the first and second fluid ports of the steering power cylinder assembly to said fluid inlet port of the pressure compensating valve assembly communicating with said storage means to adjust the difference of the fluid pressures between the first and second pressure-acting chambers.

10. A fluid-operated control apparatus as set forth in claim 1, in which said pressure reducing valve assembly further comprises solenoid-operated spool actuating means comprising a current-carrying coil unit and a permanent magnet both of which are arranged in such a manner as to cause said valve spool of the pressure reducing valve assembly to axially move in a direction to vary the degree of communication between the fluid inlet and discharge ports of the pressure reducing valve assembly by the magnetic interaction between the coil unit and the permanent magnet.

* * * * *